(12) United States Patent
Jiang

(10) Patent No.: US 8,462,791 B2
(45) Date of Patent: Jun. 11, 2013

(54) ADAPTIVE SCHEDULER FOR COMMUNICATION SYSTEMS APPARATUS, SYSTEM AND METHOD

(75) Inventor: Feng Jiang, Changsha (CN)

(73) Assignee: Nokia Siemens Networks Oy, Espoo (FI)

( * ) Notice: Subject to any disclaimer, the term of this patent is extended or adjusted under 35 U.S.C. 154(b) by 129 days.

(21) Appl. No.: 12/936,694

(22) PCT Filed: May 22, 2008

(86) PCT No.: PCT/EP2008/056304
§ 371 (c)(1),
(2), (4) Date: Dec. 27, 2010

(87) PCT Pub. No.: WO2009/141008
PCT Pub. Date: Nov. 26, 2009

(65) Prior Publication Data
US 2011/0110376 A1 May 12, 2011

(51) Int. Cl.
*H04L 12/28* (2006.01)
*H04L 12/56* (2006.01)
(52) U.S. Cl.
USPC .......................................................... 370/394
(58) Field of Classification Search
None
See application file for complete search history.

(56) References Cited

U.S. PATENT DOCUMENTS

| 5,513,282 A * | 4/1996 | Williams ..................... 382/303 |
| 5,561,768 A * | 10/1996 | Smith ............................. 712/13 |
| 5,884,046 A * | 3/1999 | Antonov ...................... 709/238 |
| 2003/0169771 A1 | 9/2003 | Ahn et al. |

FOREIGN PATENT DOCUMENTS

| EP | 1 006 701 | 6/2000 |
| WO | 2004/038647 | 5/2004 |

OTHER PUBLICATIONS

HongQian Karen Lu, Multi-stage Packet Filtering in Network Smart Cards, vol. 3928, Jan. 1, 2006, pp. 192-205.
I. A. Troxel, et al., Design and Analysis of a Dynamically Reconfigurable Network Processor, Proceedings of the 27th annual IEEE Conference, Nov. 6, 2002, pp. 483-492, a total of 10 pages.

* cited by examiner

*Primary Examiner* — Ayaz Sheikh
*Assistant Examiner* — Blanche Wong
(74) *Attorney, Agent, or Firm* — Squire Sanders (US) LLP

(57) ABSTRACT

An apparatus, system, and method may include adaptively scheduling packet processing modules by ordering the packet processing modules based on at least one of traffic composition and computational complexity of the packet processing modules. The apparatus, system and method may analyze at least one of traffic composition information derived from at least one packet data stream and computational complexity information pertaining to packet processing modules, determine an ordering of the packet processing modules based on the analyzing, wherein packets are passed through the packet processing modules until the packet meets criteria associated with a packet processing module or the packet has been passed through all of the packet processing modules, and dynamically rearrange the packet processing modules into the determined ordering.

21 Claims, 9 Drawing Sheets

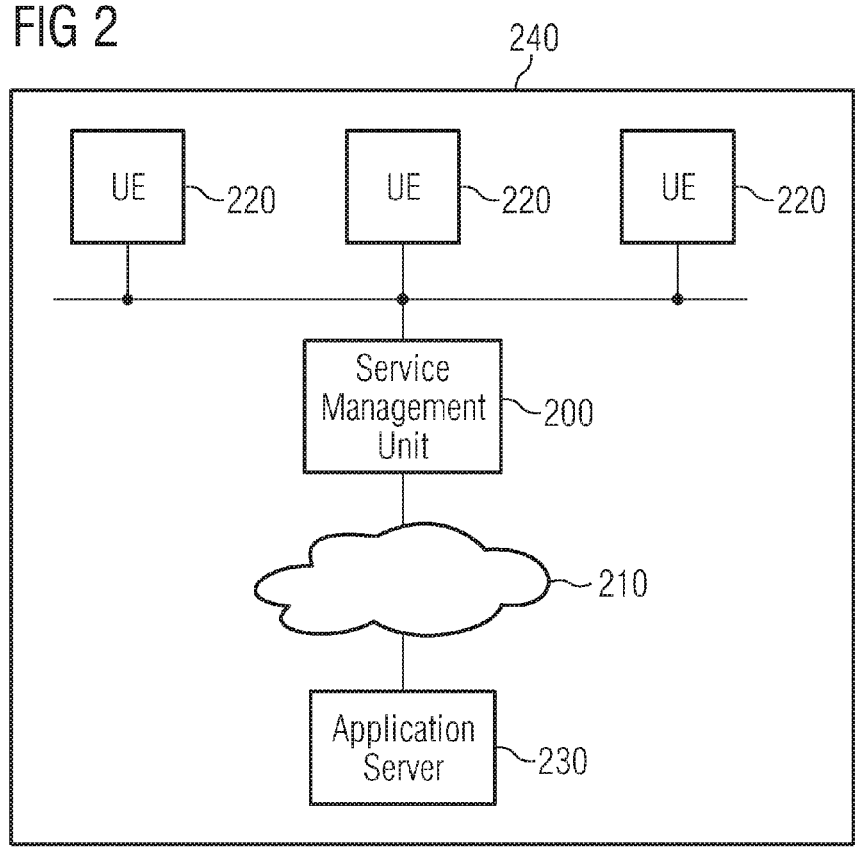
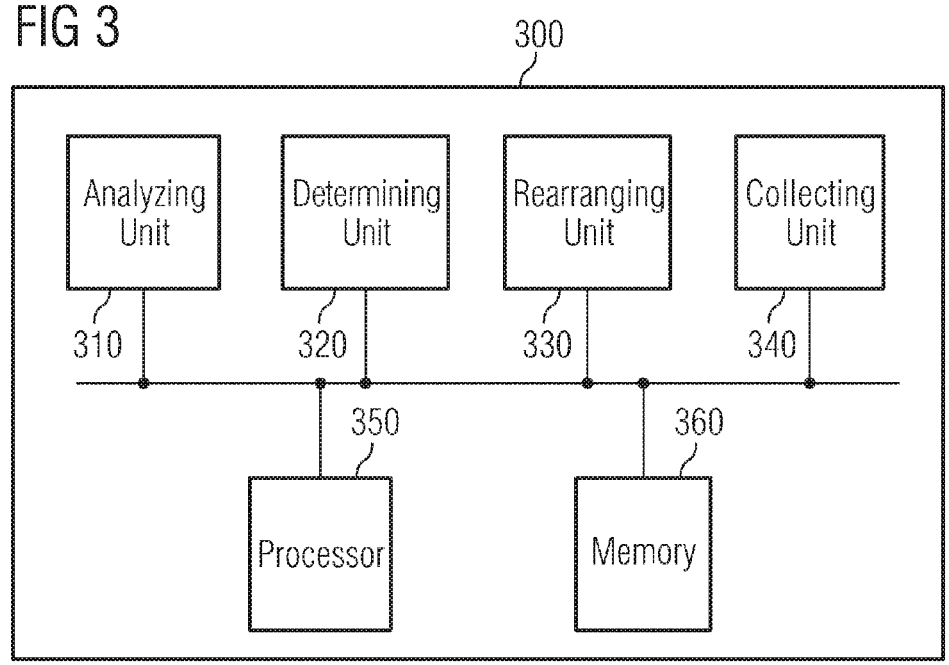

FIG 6

| Service ID | P | EL | EEL |
|---|---|---|---|
| 1 | 10% | 75 k cycles | 7.5 k cycles |
| 2 | 40% | 45 k cycles | 18 k cycles |
| 3 | 9% | 44 k cycles | 4 k cycles |
| 4 | 27% | 55 k cycles | 15 k cycles |
| 5 | 14% | 70 k cycles | 10 k cycles |

FIG 8

|  | Total Cost | Percentage |
|---|---|---|
| Current Impl. | 170 k cycles | 143% |
| Naïve Appr. | 289 k cycles | 243% |
| Our Appr. | 119 k cycles | 100% |

ADAPTIVE SCHEDULER FOR
COMMUNICATION SYSTEMS APPARATUS,
SYSTEM AND METHOD

FIELD OF THE INVENTION

The present invention relates generally to communication systems. More specifically, the present invention relates to apparatuses, systems, and methods for adaptive scheduling.

DESCRIPTION OF THE RELATED ART

In current communication systems, data for services is divided into sequentially organized packets that form one or more packet data streams for each client. Although some services have certain characteristics that help to facilitate rapid identification (for instance, Hypertext Transfer Protocol (HTTP) services usually use port 80), many services lack information that enables rapid identification. As such, core network devices intended for service-based control and management must incorporate other methods, such as signature-based methods, to identify such services. These service management devices implement the service identification methods via service identification modules (SIMs) that identify a particular service (for example, by examining the packet payload). These SIMs are arranged and executed sequentially.

SIMs work to relate packets to services. Typically, only the first few packets of a stream are used for this purpose. One stream can typically have only one service type. Thus, once the SIMs associate a stream with a certain service type by examining the first few packets, the following packets of the same stream will go through a faster path, such as from L3/L4 policing to routing as shown in FIG. 1.

FIG. 1 is a data plane diagram of service identification using statically chained SIMs. When a packet is received 100, L3/L4-based policing 110 is performed on the received packet. If the packet has a known service identified by the L3/L4-based policing 110, routing and switching 130 is performed on the packet and the packet is transmitted 140 accordingly.

However, if the packet is not identified by the L3/L4-based policing 110, the packet is passed to a statically linked, sequential chain of N SIMs 120. The packet is initially passed to a first SIM 122 identifying a first service. If the first SIM 122 identifies that the packet is of the first service, routing and switching 130 is performed on the packet and the packet is transmitted 140 accordingly. Otherwise, the packet is passed to a second SIM 124 identifying a second service. If the second SIM 124 identifies that the packet is of the second service, routing and switching 130 is performed on the packet and the packet is transmitted 140 accordingly. If not, the packet is passed to the next SIM in the sequential chain 120 until either the packet is identified by a SIM or the packet passes the Nth SIM 126 without being identified. In the latter case, the packet is identified as having an unknown service type and the service management unit routes and switches 130 the packet accordingly. If the packet is identified, the remaining packets in the stream associated with the service may be sent through a faster path (e.g. L3/L4 Policing 110 to Routing 130).

However, this architecture may have several disadvantages. According to this architecture, each received packet has to be examined against every SIM in the sequential chain 120 until the packet is successfully identified. For example, where a service identification is needed, if incoming packets are frequently associated with a service that is checked by a SIM near the end of the sequential chain 120, system performance suffers since the preceding SIMs are checked for each of the incoming packets prior to the correct service identification, costing additional processing cycles.

It is possible to examine network traffic patterns and apply the result to create a statically linked SIM chain at a software engineering or device configuration stage. However, because real world traffic may be heavily-tailed and tends to have an unpredictable composition that is influenced by time, location and other factors, when the traffic has a composition for which the configuration of the statically linked SIM chain is not optimal, such a statically linked SIM chain has an adverse impact on system performance.

SUMMARY OF THE INVENTION

Certain embodiments of the present invention may provide solutions to the problems and needs in the art that have not yet been fully solved by currently available communication system technologies. For example, certain embodiments of the present invention may provide a method, apparatus and system for adaptively rearranging an ordering of modules that examine packets.

In one embodiment of the present invention, a method may include analyzing at least one of traffic composition information derived from at least one packet data stream and computational complexity information, determining an ordering of packet processing modules based on the analyzing, wherein packets are passed through the packet processing modules until a given packet meets certain criteria or the packet has been passed through all of the packet processing modules, and dynamically rearranging the order of the packet processing modules into the determined ordering.

In some embodiments, the rearranging may further include one or more of assigning packet processing modules to module groups, reassigning packet processing modules to different module groups and changing a sequential order of the module groups. In some embodiments, packet processing modules may be processed in parallel, sequentially, or a combination of both.

In some embodiments, the criteria may include one or more of identification of a packet type, identification of a payload type, identification of a packet group, identification of a payload group and identification of a service type. In some embodiments, the analyzing may be performed periodically.

In some embodiments, the computational complexity information may include an execution length in terms of at least one of processing cycles and time. In some embodiments, the analyzing of the traffic composition may include determining respective probabilities that a packet meets criteria associated with a respective packet processing module.

In some embodiments, the ordering of the packet processing modules may be an optimal ordering requiring a minimum amount of processing resources.

In certain embodiments, the analyzing may include determining a minimum average cost C of analyzing the packets in the packet stream. Where $D^T$ is a vector denoting the order of the packet processing modules, W is an estimated execution length vector, P is a probability vector denoting respective probabilities that a packet meets criteria associated with a respective packet processing module and L is a vector denoting an execution length for each packet processing module, and $D^T$ denotes that element $d_i = j$, $(i, j \in [0, n))$ indicates that the i-th packet processing module is scheduled at the j-th position, the minimum average cost C may be determined by the equation $$MinC = \sum_i \{D^T \cdot W(P, L)\}.$$

In some embodiments, the packet processing modules may be service identification modules that identify services. In some embodiments, the services may include at least one of e-mail, web browsing, video gaming and downloading files. In some embodiments, the analyzing of the traffic composition may include determining respective probabilities that a packet belongs to a service identified by a respective service identification module.

In some embodiments, the method may include collecting information on traffic composition based on packets meeting the criteria associated with the packet processing modules during a predetermined period of time. The analyzed traffic composition information may include the collected information.

In some embodiments, the determining of the ordering may include sorting the packet processing modules in descending order according to estimated execution lengths. In certain embodiments, the method may include scheduling execution of the packet processing modules in the descending order and sequentially executing the packet processing modules until either the packet meets the criteria associated with a packet processing module or no more packet processing modules remain to be executed.

In a further embodiment, a computer program product may comprise code means adapted to produce the steps of any of the embodiments of the above outlined method.

In another embodiment, an apparatus may include an analyzing unit or means configured to analyze at least one of traffic composition information derived from at least one packet data stream and computational complexity information, a determining unit or means configured to determine an ordering of packet processing modules based on the analyzing by the analyzer, wherein the determining unit or means is configured to pass packets through the packet processing modules until a given packet meets criteria associated with a packet processing module or the determining unit or means has passed the packet through all of the packet processing modules, and a rearranging unit or means configured to dynamically rearrange the order of the packet processing modules into the determined ordering.

In some embodiments, the rearranging unit or means may further be configured to perform one or more of assigning packet processing modules to module groups, reassigning packet processing modules to different module groups and changing a sequential order of the module groups. In some embodiments, the apparatus may be configured to process packet processing modules in parallel, sequentially, or a combination of both.

In some embodiments, the criteria may include one or more of identification of a packet type, identification of a payload type, identification of a packet group, identification of a payload group and identification of a service type. In some embodiments, the analyzing unit or means may be configured to perform the analysis periodically.

In certain embodiments, the rearranging unit or means may be configured to dynamically rearrange the packet processing modules during a runtime of the apparatus. In some embodiments, the computational complexity information may comprise an execution length in terms of at least one processing cycles and time. In some embodiments, the analyzing unit or means may be configured to determine respective probabilities that a packet meets the criteria associated with a respective packet processing module when analyzing the traffic composition.

In certain embodiments, the rearranging unit or means may be configured to order the packet processing modules in an optimal ordering that requires a minimum amount of processing resources.

In certain embodiments, the analyzing unit or means may determine a minimum average cost C of analyzing the packets in the packet stream. Where $D^T$ is a vector denoting the order of the packet processing modules, W is an estimated execution length vector, P is a probability vector denoting respective probabilities that a packet meets the criteria associated with a respective packet processing module and L is a vector denoting an execution length for each packet processing module, and $D^T$ denotes that element $d_i=j$, $(i,j \in [0,n))$ indicates that the i-th packet processing module is scheduled at the j-th position, the analyzing unit or means may be configured to determine the minimum average cost C by the equation $$MinC = \sum_i \{D^T \cdot W(P, L)\}.$$

In some embodiments, the packet processing modules may be service identification modules that identify services. In some embodiments, the services may include at least one of e-mail, web browsing, video gaming and downloading files. In some embodiments, the analyzing unit or means may be configured to analyze the traffic composition by determining respective probabilities that a packet belongs to a service identified by a respective service identification module.

In certain embodiments, the apparatus may include a collecting unit or means configured to collect information on traffic composition based on packets that meet the criteria associated with the packet processing modules during a predetermined period of time, wherein the traffic composition information analyzed by the analyzing unit or means may include the collected information.

In certain embodiments, the determining unit or means may be configured to determine the ordering by sorting the packet processing modules in descending order according to estimated execution lengths. In some embodiments, the apparatus may be further configured to schedule execution of the packet processing modules in the descending order and to sequentially execute the packet processing modules until either the packet meets the criteria associated with a packet processing module or no more packet processing modules remain to be executed.

In some embodiments, the apparatus may be a server, a router or a switch which may be located in a wireless or a fixed network.

In a further embodiment of the present invention, a computer program product embodied on a computer-readable medium may control a processor to analyze at least one of traffic composition information derived from at least one packet data stream and computational complexity information, to determine an execution order of packet processing modules based on the analyzing, wherein packets are passed through the packet processing modules until a given packet meets the criteria associated with a packet processing module or the packet has been passed through all of the packet processing modules, and to dynamically rearrange the order of the packet processing modules into the determined execution order.

In yet another embodiment, a system may include user equipment and a service management device. The service management device may include an analyzing unit or means configured to analyze at least one of traffic composition information derived from at least one packet data stream received from user equipment and computational complexity information, a determining unit or means configured to determine an ordering of packet processing modules based on the analyzing by the analyzer, wherein the determining unit or means is configured to pass packets through the packet processing modules until a given packet meets criteria associated with a packet processing module or the determining unit or means has passed the packet through all of the packet processing modules, and a rearranging unit or means configured to dynamically rearrange the order of the packet processing modules into the determined ordering.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 is an architectural diagram illustrating a system having an apparatus for adaptively rearranging an ordering of packet processing modules examining packets, in accordance with one embodiment of the present invention;

FIG. 3 is a block diagram illustrating a service management unit for adaptively rearranging an ordering of packet processing modules examining packets, in accordance with one embodiment of the present invention;

FIG. 6 is a table diagram illustrating an example of services identified during a period of time;

FIG. 8 is a table diagram illustrating costs in processing cycles of the approaches illustrated in FIGS. 7A-C.

DETAILED DESCRIPTION OF THE PREFERRED EMBODIMENT(S)

Figure 1:
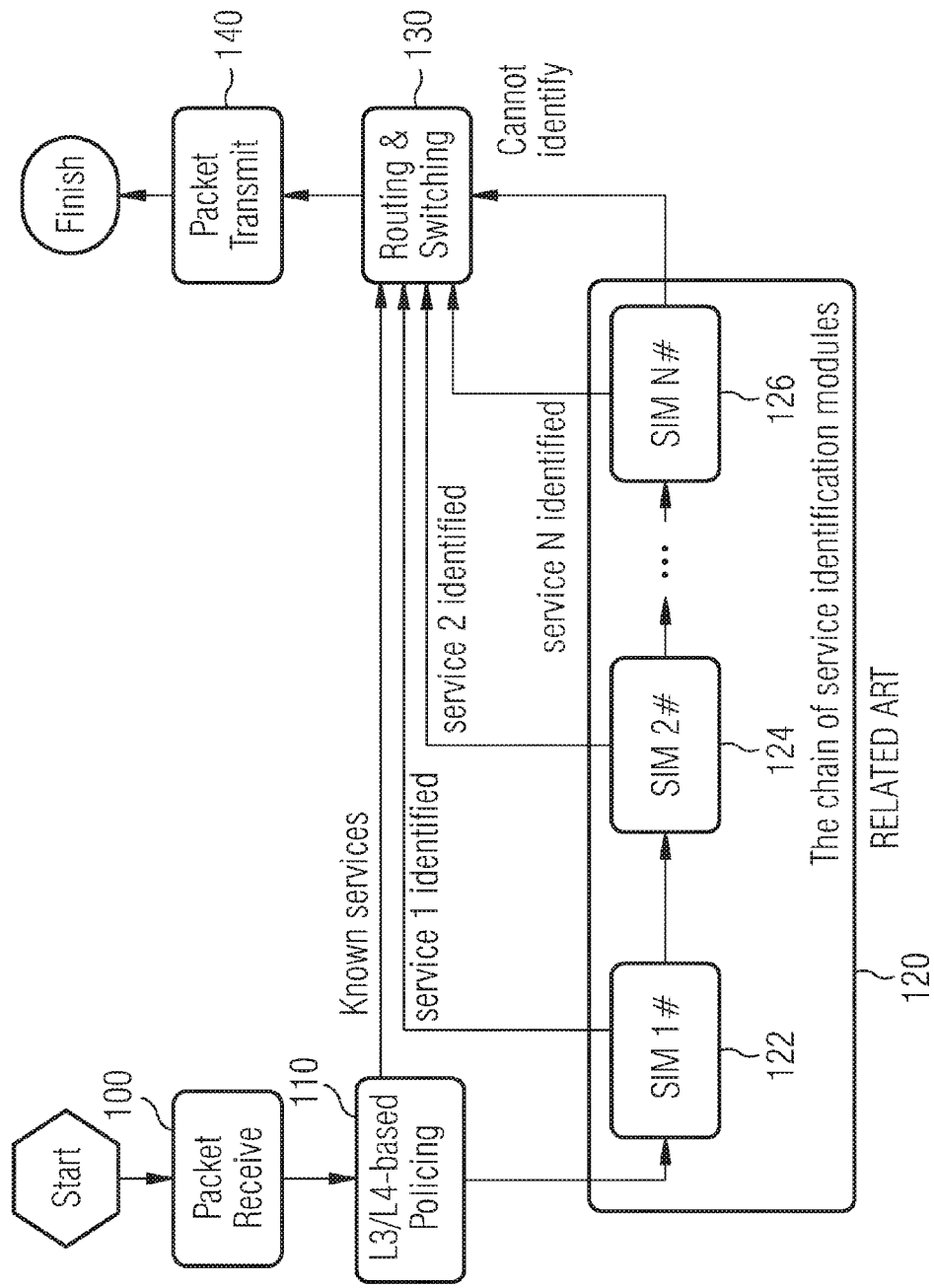
FIG. 1 is a data plane diagram of service identification using statically chained SIMs.

It will be readily understood that the components of various embodiments of the present invention, as generally described and illustrated in the figures herein, may be arranged and designed in a wide variety of different configurations. Thus, the following more detailed description of the embodiments of an apparatus, system, and method of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

In addition, while the terms data and packet have been used in the description of the present invention, the invention may be applied to many types of network data. For purposes of this invention, the term data includes packet, cell, frame, datagram, bridge protocol data unit packet, packet data, packet payload and any equivalents thereof. The packet processing modules examine packets and may examine a packet header, packet payload, and/or one or more data fields in the payload or payload content.

FIG. 2 is an architectural diagram depicting a system 240 including a service management unit 200 for adaptively rearranging an ordering of packet processing modules examining packets, a network 210, user equipment 220 and an application server 230, in accordance with one embodiment of the present invention. One skilled in the art will readily understand that "user equipment" may include a cellular phone, a pager, a personal data assistant (PDA), a personal computer, or any other device capable of performing the operations associated with the "user equipment" as described herein. One skilled in the art will also recognize that in some embodiments, either the same network 210 or a different network or several different networks may be located between the user equipment 220 and the service management unit 200.

User equipment 220 sends packet data streams for services through the service management unit 200 and on to the application server 230 via the network 210. The service management unit 200 routes the packet data streams from the user equipment 220 to the application server 230 and stores traffic composition information pertaining to the passed through packet data streams. The service management unit passes at least some of the packets of the packet data streams through the packet processing modules to determine whether packets meet certain criteria associated with the packet processing modules and routes the packets accordingly.

The criteria may include one or more of identification of a packet type, identification of a payload type, identification of a packet group, identification of a payload group and/or identification of a service type. However, one skilled in the art will appreciate that the criteria may pertain to any successful identification. The analyzing may also be performed periodically. Each of the packet processing modules may identify whether packets of the one or more packet data stream have a predetermined packet type (for example, e-mail or web browsing).

In some embodiments, the service management unit 200 periodically analyzes the traffic composition information derived from the packet data streams received from the user equipment 220 and computational complexity information pertaining to the packet processing modules. In some embodiments, the computational complexity information may include a number of processor cycles that a given packet processing module requires and/or a time required for execution of the packet processing module by the service management unit 200. This analysis may be performed, for example, every ten minutes.

Based on the analysis of the traffic composition information and the computational complexity information (for example of the packet processing modules), the service management unit 200 may then determine an ordering of the packet processing modules. The packet processing modules may be arranged in a sequential chain or in a mixture of parallel modules and sequential modules. The packet processing modules may also be arranged in module groups that include one or more packet processing modules, where the module groups may be arranged in a sequential chain. The ordering of the packet processing modules may reduce the processing resources required for the service management unit 200 to process the packet data streams. The service management unit 200 may then dynamically rearrange the order of the packet processing modules into the determined ordering.

One skilled in the art will appreciate that a "service management unit" could also be embodied as a server, a router, a switch or any other suitable network device, or combination of devices in a wireless network, a fixed network or any other kind of network. Presenting the above-described functions as being performed by a "service management unit" is not intended to limit the scope of the present invention in any way, but is intended to provide one example of many embodiments of the present invention. Indeed, method, system and apparatus disclosed herein may be implemented in localized and distributed forms consistent with networking technology.

FIG. 3 is a block diagram depicting a service management unit 300 for adaptively rearranging an ordering of modules examining packets, in accordance with one embodiment of the present invention. The depicted service management unit 300 includes an analyzing unit 310, a determining unit 320, a rearranging unit 330, a collecting unit 340, a processor 350 and memory 360. In certain embodiments, the service management unit 300 corresponds to the service management unit 200 of FIG. 2.

The collecting unit 340 may collect information on traffic composition based on packets meeting criteria associated with the packet processing modules during a predetermined period of time. The analyzing unit 310 may analyze traffic composition information derived from at least one packet data stream and/or computational complexity information (for example of the packet processing modules). The traffic composition information and computational complexity information may pertain to a sequential chain of packet processing modules used by the service management unit 300 and/or to module groups including one or more packet processing modules, where the module groups may be arranged in a sequential chain. The analyzing unit 310 may then provide the analysis to the determining unit 320. The determining unit 320 may determine an ordering of the packet processing modules based on the analysis by the analyzing unit 310. The determining unit 320 may then provide the determined ordering of the packet processing modules to the rearranging unit 330. The rearranging unit 330 may dynamically rearrange the order of the packet processing modules into the determined ordering. The rearranging unit 330 may perform the rearranging during the runtime of the service management unit 300.

It should be noted that many of the functional features described in this specification have been presented as units, in order to more particularly emphasize their implementation independence. For example, a unit may be implemented as a hardware circuit comprising custom very large scale integration (VLSI) circuits or gate arrays, off-the-shelf semiconductors such as logic chips, transistors, or other discrete components. A unit may also be implemented in programmable hardware devices such as field programmable gate arrays, programmable array logic, programmable logic devices or the like.

Units may also be at least partially implemented in software for execution by various types of processors. An identified unit of executable code may, for instance, comprise one or more physical or logical blocks of computer instructions which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit. Units may be stored on a computer-readable medium, which may be, for instance, a hard disk drive, flash device, random access memory (RAM), tape, or any other such medium used to store data.

Indeed, a unit of executable code could be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different storage devices, and may exist, at least partially, merely as electronic signals on a system or network.

Figure 4:
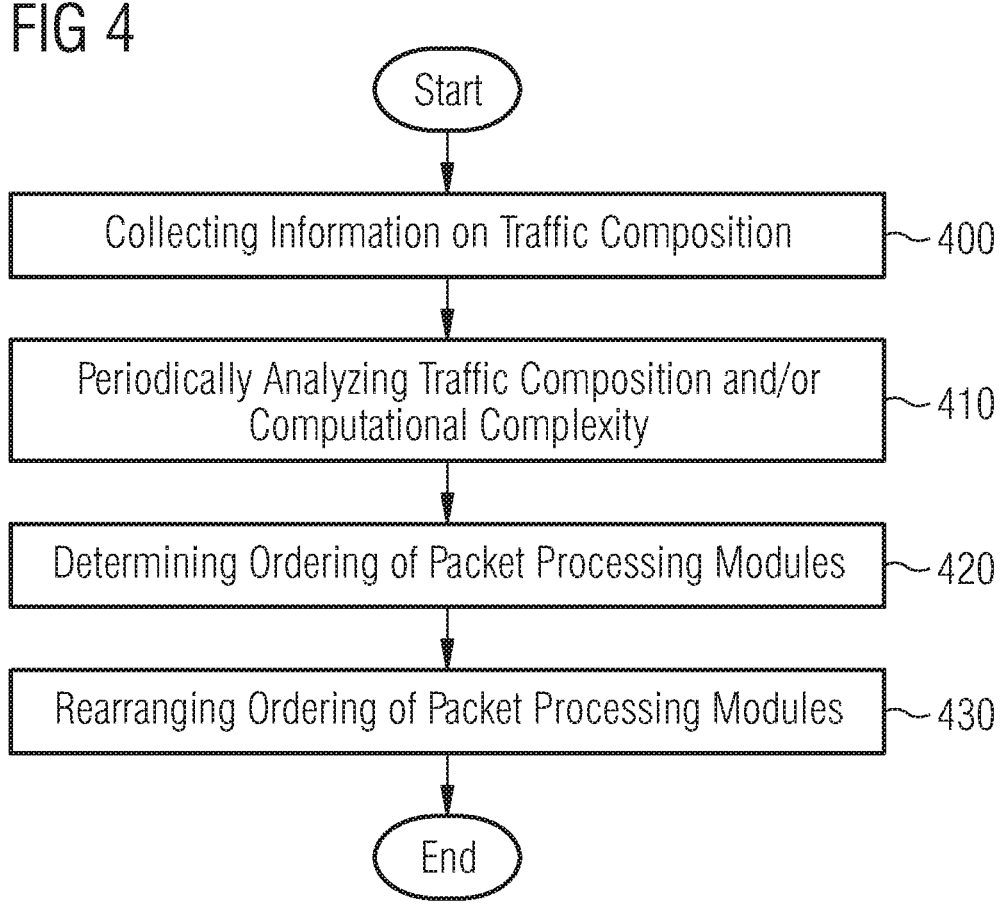
FIG. 4 is a flow chart diagram illustrating a method for adaptively rearranging an ordering of packet processing modules examining packets, in accordance with an embodiment of the present invention.

FIG. 4 is a flow chart diagram depicting a method for adaptively rearranging an ordering of packet processing modules examining packets, in accordance with one embodiment of the present invention. The depicted method includes collecting information on traffic composition 400, analyzing traffic composition and/or computational complexity 410, determining an ordering of a sequential chain of packet processing modules 420 and rearranging the sequential chain of packet processing modules 430. In certain embodiments, the operations of the method depicted in FIG. 4 may be executed by the service management servers 200 and 300 of FIG. 2 and FIG. 3, respectively. The operations of the method provide one embodiment for adaptively rearranging an ordering of modules examining packets.

Collecting information on traffic composition 400 may include collecting information on traffic composition based on packets meeting criteria associated with the packet processing modules during a predetermined period of time. Analyzing traffic composition information and/or computational complexity information 410 may include determining the computational complexity based on required processing cycles and/or time of the packet processing modules. The analyzing of the traffic composition information may include determining respective probabilities that a packet meets certain criteria associated with a respective packet identification module.

Determining the ordering of the packet processing modules 420 may include determining an ordering of the packet processing modules that is optimal in the sense that the ordering requires a minimum amount of processing resources and/or optimizes system performance in terms of overall throughput and delay. The rearranging of the packet processing modules 430 may then be performed in accordance with the determined ordering.

Figure 5:
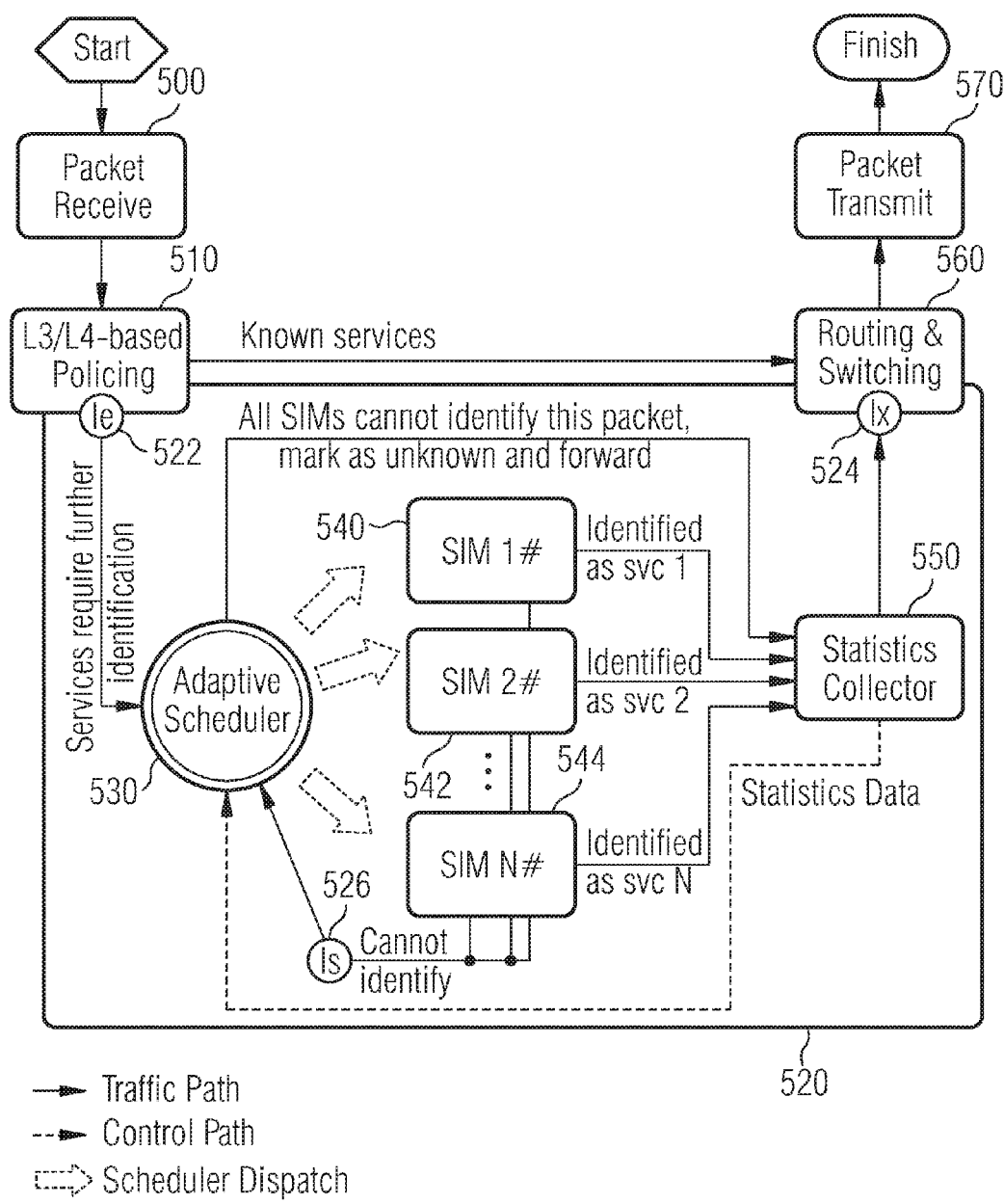
FIG. 5 is a data plane diagram illustrating service identification using adaptively scheduled SIMs, in accordance with one embodiment of the present invention.

FIG. 5 is a data plane diagram of service identification using adaptively scheduled SIMs, in accordance with one embodiment of the present invention. When a packet is received 500, L3/L4-based policing 510 may be performed on the received packet. If the packet has a known service identified by the L3/L4-based policing 510, routing and switching 560 may be performed on the packet and the packet may be transmitted 570 accordingly.

However, if the packet is not identified by the L3/L4-based policing 510, the packet may be passed to an adaptive scheduler 530 of an adaptive service scheduling module 520 through an entrance interface Ie 522. While a person of ordinary skill in the art will readily understand that the ordering of SIMs may be different, in one example, the initial SIM ordering of the scheduler is the first SIM 540, the second SIM 542, and so on until the Nth SIM 544, logically comprising a sequential chain of SIMs. In this embodiment, each SIM identifies one or more different services. While SIMs are illustrated in FIG. 5, one of ordinary skill in the art will appreciate that packets may be examined and processed for purposes other than identifying services (for example identifying the packet type, the payload type or any kind of packet/payload groups). SIMs may also be grouped. The grouped SIMs may then be addressed as one entity by the adaptive scheduler. Grouped or ungrouped, SIMs may be processed in parallel, sequentially, or a combination of both.

The adaptive scheduler 530 in this example first passes the packet to the first SIM 540. If the first SIM 540 identifies the packet as pertaining to a corresponding service identified by the first SIM 540, the first SIM 540 provides an indication to a statistics collector (or statistics collecting unit) 550 that the packet was identified. The statistics collector 550 may provide an indication to the adaptive scheduler 530 that the packet was identified. The statistics collector 550 may then pass the packet onward for switching and routing 560 and packet transmission 570 via exit interface Ix 524 of the adaptive service scheduling module 520. Further on, the L3/L4-based policing block 510 may be informed about the identified service relationship of the identified packet stream. If the first SIM 540 fails to identify the packet, an indication that the packet was not identified by the first SIM 540 is sent to the adaptive scheduler 530 via interface Is 526 of the adaptive service scheduling module 520. The interface Is 526 may contain a packet queue (not shown) that attaches necessary control information for use by the adaptive scheduler 530.

The adaptive scheduler 530 may then pass the packet to another SIM, such as the second SIM 542. If the second SIM 542 identifies the packet as pertaining to a corresponding service identified by the second SIM 542, the second SIM 542 provides an indication to the statistics collector 550 that the packet was identified. Otherwise, the second SIM 542 sends an indication that the packet was not identified to the adaptive scheduler 530 via interface Is 526 of the adaptive service scheduling module 520. The adaptive scheduler 530 proceeds to the next SIM until either the packet is identified or the Nth SIM 544 fails to identify the packet. In the latter case, the adaptive scheduler 530 may provide an indication to the statistics collector 550 that the SIMs could not identify the packet and said packet should be marked as unknown.

Periodically (for example, every ten minutes), the adaptive scheduler 530 may receive data regarding traffic composition statistics from the statistics collector 550. This data may be sent by the statistics collector 550 at the request of the adaptive scheduler 530. A person of ordinary skill in the art will recognize that the time period for receiving statistics data does not need to be fixed and could be variable based on considerations such as processor load, lack of significant variation in a plurality of previous samplings, etc. The adaptive scheduler 530 may analyze traffic composition information received from the statistics collector 550 and/or computational complexity information pertaining to the packet identification modules. The traffic composition statistics may include respective probabilities that a packet meets criteria associated with a respective packet processing module. The computational complexity information may include processor cycles and/or time required to execute each SIM. A person of ordinary skill in the art will recognize that all or part of the analysis of the collected statistics may be performed by the statistics collector 550.

The analysis by the adaptive scheduler 530 may include determining a minimum average cost C of analyzing the received packets. Consider the following.

Let S denote a node set which contains n SIMs, each with execution length (EL) $l_s$, $s \in [0,n)$. Also let P denote a vector where elements $p_s$ of vector P represent a probability that a packet belongs to service s ($s \in S$). We may assume that arrival probabilities of different services are independent and traffic distribution is stable with respect to time intervals between two scheduling decision updates (which is usually true in the real world), and formulate the problem as minimizing the average cost C. This minimum average cost may be determined by the following equation:

$$\text{Min} C = \sum_i \{D^T \cdot W(P, L)\} \qquad (1)$$

In the equation, $D^T$ is a vector denoting the order of the packet processing modules (for example, in a sequential chain). W is an estimated execution length vector and L is a vector denoting an execution length for each packet processing module. $D^T$ denotes that element $d_i = j$, $(i, j \in [0,n))$ indicates that the i-th packet processing module is scheduled at the j-th position.

W(·) is an estimated execution length (EEL) vector, in which each element represents the processing required by a respective SIM to identify a corresponding service, which can be abstracted and measured in processor cycles. For example, a SIM for HTTP is basically a keyword seeker. If we assume the average number of processor cycles required to successfully identify an HTTP packet (then bypass other SIMs and jump to the end of the sequential chain) is K, total bytes in a packet subject to identification is B, keyword matching is done at block size $E_b$, and the average number of processor cycles required to perform keyword matching on a block of data is $C_s$, W(·) may take the form:

$$w_s = K \cdot l_s \cdot p_s; l_s = \lceil B/E_b \rceil \cdot C_s; s \in S \qquad (2)$$

Theorem 1: The optimum solution for the above problem is achieved if following condition is satisfied:

$$\forall d_i \geq d_j, \exists w_i \leq w_j, (i,j) \in S \qquad (3)$$

The proof is straightforward. Select (i, j)∈S and let $w_i=w$, $w_j=w+\delta$, $d_i=d$, $d_j=d+\epsilon$, where $(\delta,\epsilon)\in[0,+\infty)$. Consider the following two cases $C_I$ and $C_{II}$ (note that case $C_{II}$ reflects equation 3):

$$C_I = w_i d_i + w_j d_j + \sum_{s\in S\setminus(i,j)} d_s \cdot w_s$$

$$C_{II} = w_i d_j + w_j d_i + \sum_{s\in S\setminus(i,j)} d_s \cdot w_s$$

So we have $$C_I - C_{II} = (w_i d_i + w_j d_j) - (w_i d_j + w_j d_i) = \delta\epsilon \geq 0$$

The equal sign is taken if and only if $w_i=w_j$. Considering the arbitrariness in choosing (i, j), Theorem 1 states the optimal solution to minimize average cost C.

In summary, since the scheduling is adaptive to traffic distribution, the optimal adaptation strategy can be constructed to identify favored SIMs by their EEL, a technique simplified from entropy coding schemes, such as the Huffman coding family and arithmetic coding. In principle, this technique contains the following steps:

Algorithm 1:
1) Acquire up-to-date traffic composition information;
2) Sort all SIMs according to their $w_s$, ($\forall s\in S$), in descending order, and store the result in list L;
3) For each incoming packet, schedule the most favored SIM in list L to handle the packet;
4) If a service is successfully identified, terminate the identification process of this packet and report the service type, e.g. HTTP. Otherwise, the packet is scheduled for the next most favored SIM in list L; and
5) If no more SIMs exist to schedule, terminate identification of this packet and report its service type as unknown. Otherwise, repeat Step 4.

For a more detailed explanation of the Huffman coding family, please see D. A. Huffman, A Method for the Construction of Minimum-Redundancy Codes, Proceedings of the IRE, 1952.

For a more detailed explanation of arithmetic coding please see J. J. Rissanen and G. G. Langdon, Jr., Arithmetic Coding, IBM Journal of Research and Development 23 (2), March 1979.

By way of example, consider FIGS. 6-8. FIG. 6 is a table diagram depicting an example of services identified during a period of time. The embodiment depicted in the table 600 has five services represented by rows 610, 615, 620, 625 and 630. The services are identified by corresponding service IDs in column 635, and each service corresponds with a SIM. The probability P that that a packet will be associated with a given service is represented by column 640. The execution length is given in thousands of cycles by column 645. The estimated execution length (EEL) is obtained by multiplying the probability P that a given service is received by the execution length (EL) for the corresponding SIM. The EEL for each SIM is represented by column 650.

As depicted in FIG. 6, the service represented by row 615 has the highest EEL of the services, at 18 k cycles. For the SIMs represented by this table, to obtain an optimal ordering, the SIMs may be arranged in descending order in a sequential chain such that the SIM having the highest EEL is first in the sequential chain and the SIM having the lowest EEL is last in the sequential chain. Thus, the optimal ordering would be services 2, 4, 5, 1 and 3, respectively.

Figure 7A:
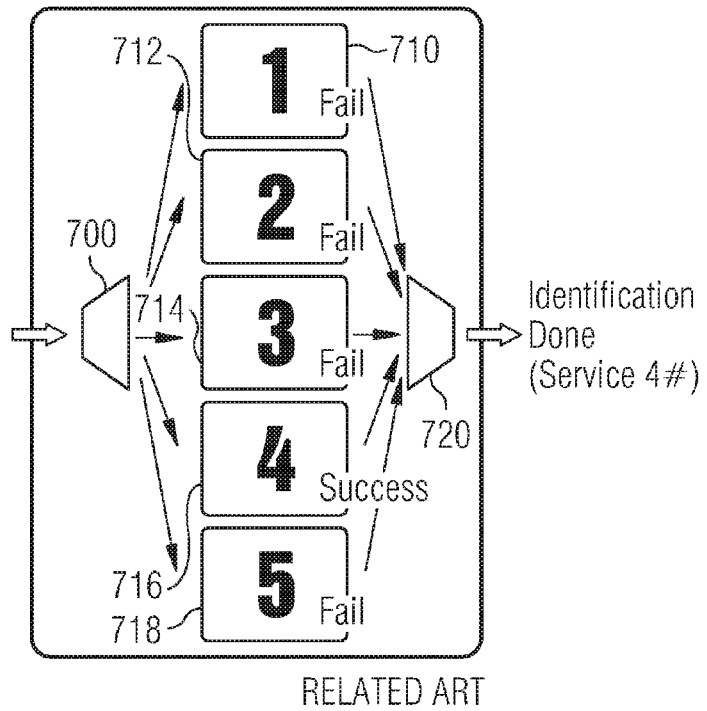
FIG. 7A is a flow diagram illustrating a naive parallelization approach to examining packets with SIMs.

FIG. 7A is a flow diagram depicting a naive parallelization approach to examining packets with SIMs. A packet is distributed 700 to SIMs identifying a first 710, second 712, third 714, fourth 716 and fifth 718 service, respectively. The results from the SIMs are then aggregated 720. A packet having a service type identified by the fourth SIM 716 is then passed through all of the SIMs. As can be seen, all SIMs failed to identify the service with the exception of the fourth SIM 716, which successfully identified the service. A significant disadvantage to this approach is that all SIMs must be executed to identify a service.

Figure 7B:
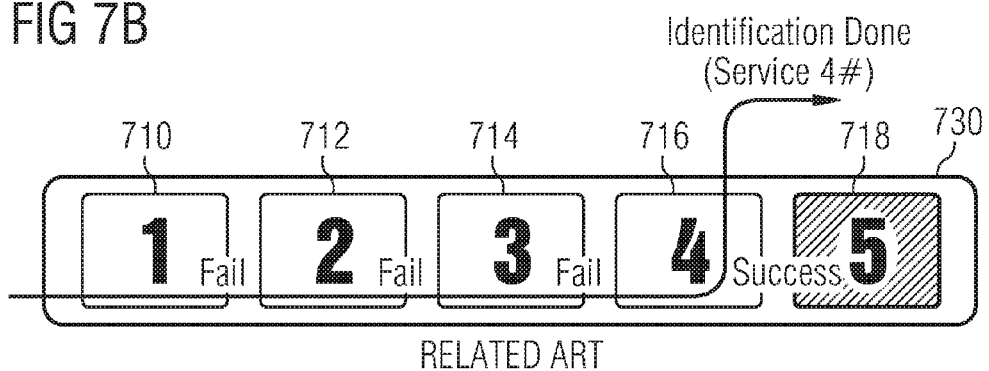
FIG. 7B is a flow diagram illustrating the current implementation for examining packets with SIMs.

FIG. 7B is a flow diagram depicting the current implementation for examining packets with SIMs. The initial ordering of the sequential chain 730 is the first 710, second 712, third 714, fourth 716 and fifth 718 SIMs, respectively. If the packet having the service identified by the fourth 716 SIM is passed through this sequential chain 730, the packet is examined by four SIMs.

Figure 7C:
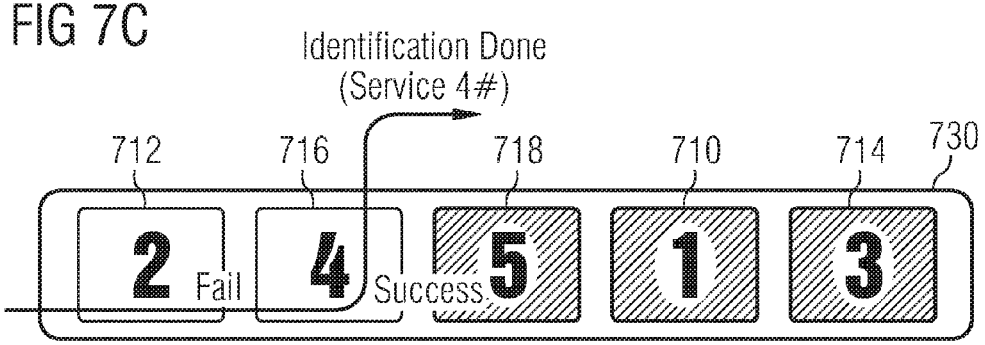
FIG. 7C is a flow diagram illustrating a rearranged order of SIMs examining packets, in accordance with an embodiment of the present invention.

FIG. 7C is a flow diagram depicting a rearranged order of SIMs examining packets for a packet type, in accordance with an embodiment of the present invention. In this example, the SIMs have the probabilities, ELs and EELs illustrated in FIG. 6. As discussed above with respect to FIG. 6, the optimal ordering is services 2, 4, 5, 1 and 3, respectively. Accordingly, the rearranged sequential chain 730 is the second 712, fourth 716, fifth 718, first 710 and third 714 SIMs, respectively. In the case where a packet is of the service identified by the fourth SIM 716, as illustrated, the packet is only examined by the second 712 and fourth 716 SIMs.

Figure 7D:
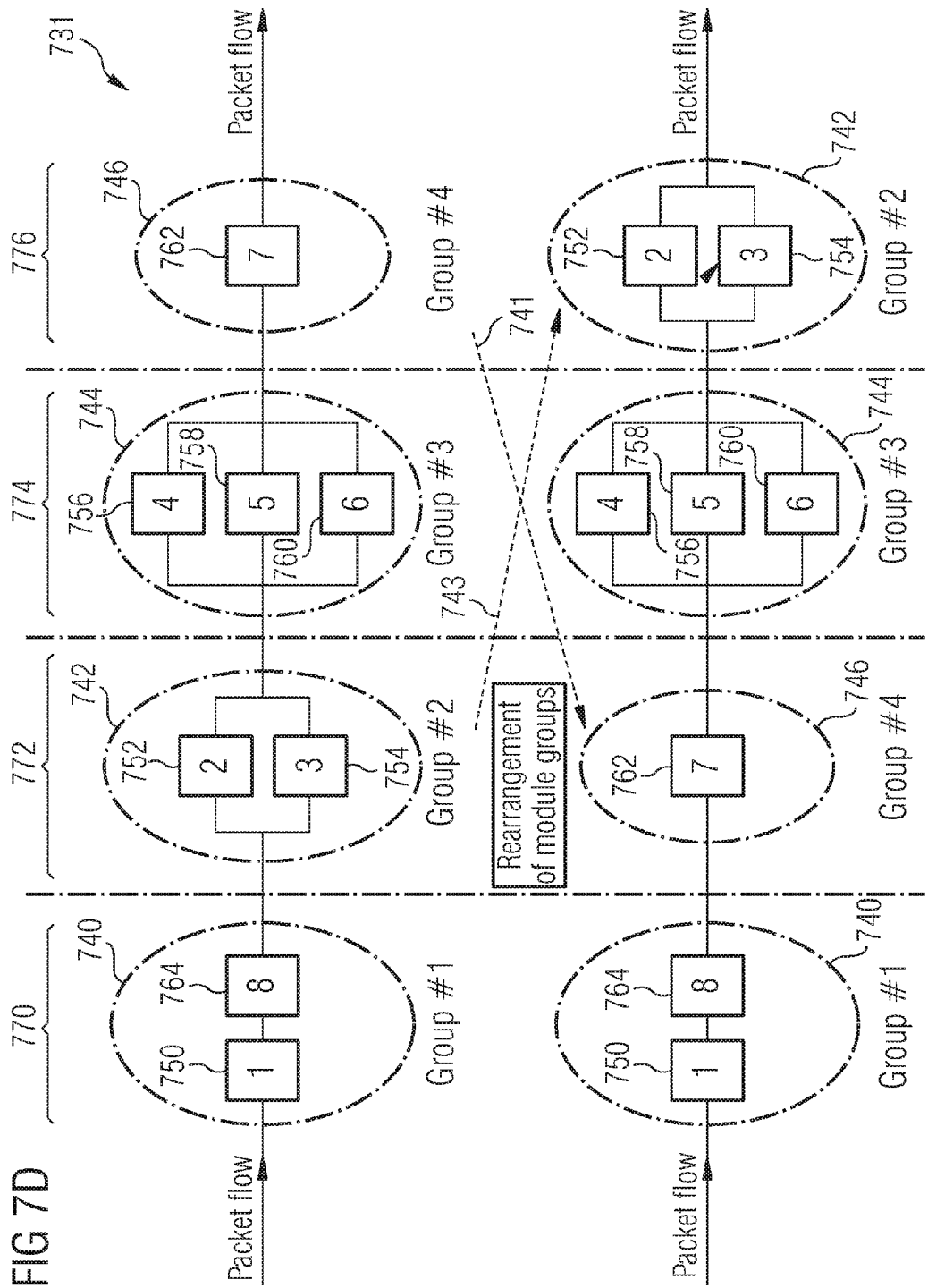
FIG. 7D is a flow diagram illustrating a rearranged order of module groups, in accordance with an embodiment of the present invention.

FIG. 7D is a flow diagram 731 depicting a rearranged order of module groups, in accordance with an embodiment of the present invention. As can be seen, a first 740, second 742, third 744 and fourth 746 group of packet processing modules are arranged in a first 770, second 772, third 774 and fourth 776 position, respectively. As can be seen, the second group 742 is rearranged 743 to the fourth position 776 and the fourth group 746 is rearranged 741 to the second position 772. This rearranging may occur, for instance, in response to analysis of traffic composition.

Figure 7E:
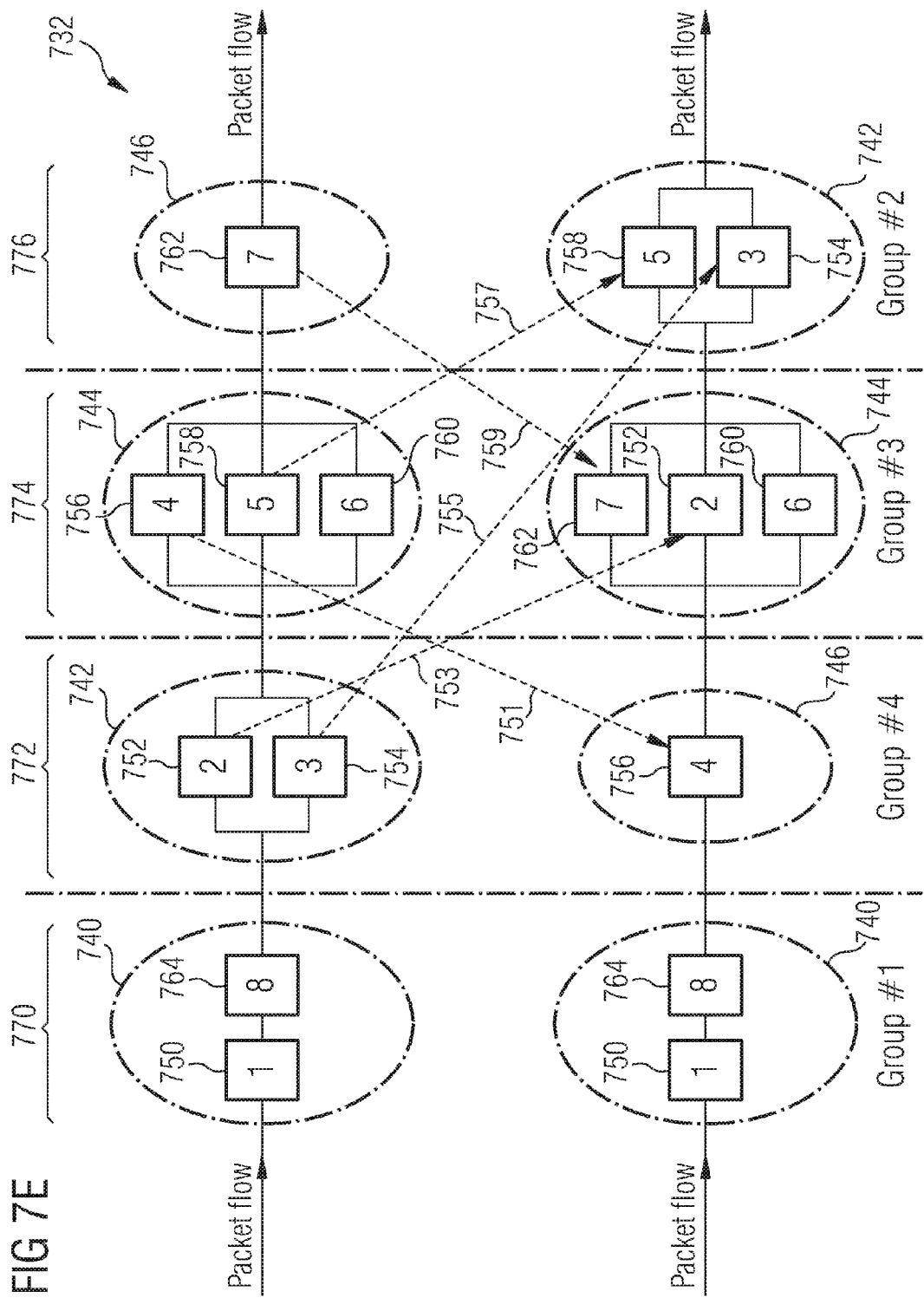
FIG. 7E is a flow diagram illustrating a rearranged order of packet processing modules, in accordance with an embodiment of the present invention.

FIG. 7E is a flow diagram 732 depicting a rearranged order of packet processing modules, in accordance with an embodiment of the present invention. First 750, second, 752, third 754, fourth 756, fifth 758, sixth 760 and seventh 762 packet processing modules are depicted. As an example the packet processing modules are grouped to module groups 740, 742, 744 and 746 (Module groups are not required here. They are included here to show an embodiment where modules can be rearranged or reassigned between different groups). Packet processing modules executed serially and packet processing modules executed in parallel are arranged in first 770, second 772, third 774 and fourth 776 positions. As can be seen, the fourth 756 packet processing module is rearranged 751 to the second position 772, the second 752 packet processing module is rearranged 753 into the third 774 position in parallel with the sixth 760 and seventh 762 packet processing modules, the third 754 packet processing module is rearranged 755 into the fourth 776 position in parallel with the fifth 758 packet processing module, the fifth 758 packet processing module is rearranged 757 into the fourth 776 position in parallel with the third 754 packet processing module, and the seventh 762 packet processing module is rearranged 759 into the third 774 position in parallel with the second 752 and sixth 760 packet processing modules. This rearranging may occur, for instance, in response to analysis of traffic composition.

FIG. 8 is a table diagram depicting costs in processing cycles of the approaches illustrated in FIGS. 7A-C. The table 800 shows the total cost 840 and percentage 850 of the naive parallelization implementation 820 of FIG. 7A, the current sequential implementation 810 of FIG. 7B and the improved implementation 830 of FIG. 7C. The improved implementation 830 is used as the baseline for the percentages.

Under the current implementation of a static sequential SIM chain, the cost is $$C_{CI} = \sum_{i=1}^{5}\left(P_i \cdot \sum_{j=1}^{i} EL_j\right) = P_1 \cdot EL_1 + P_2 \cdot (EL_1 + EL_2) + \ldots = 170\text{k cycles.}$$

Under the naive parallelization approach, the cost is the sum of the ELs for each SIM in FIG. 6, which is 289 k cycles. Under the improved implementation discussed above with respect to FIG. 5, the cost is 119 k cycles.

As such, the naive parallelization approach requires 243% and the current implementation requires 143% of the processing cycles required by the improved implementation. Thus, the improved implementation realizes a significant savings in processing time for processing packets in this example.

One advantage of certain embodiments includes improved system performance in terms of overall throughput and delay by intelligent analysis of traffic composition and dynamic SIM scheduling. It is desirable for network operators to improve network resource utilization and subscriber experience. Another advantage of certain embodiments is ease of implementation. In certain embodiments, the invention may be implemented in software, which is flexible in terms of parameter configuration, algorithm update, and other such factors. Integration of this software generally has a minor impact on other system modules because interfaces such as Ie 522, Ix 524 and Is 526 of the embodiment shown in FIG. 5 only require changing function calls of respective system modules for policing, routing and switching and SIMs. Yet another advantage of certain embodiments is extensibility. Certain embodiments may be extended to other systems in which system performance largely depends on characteristics of inputs (such as input traffic composition) and in which system modules may be dynamically invoked to form an optimal processing path according to the characteristics of the inputs.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The invention claimed is:

1. A method, comprising:
analyzing traffic composition information derived from packets in at least one packet data stream and computational complexity information pertaining to packet processing modules that process the packets of the at least one packet data stream;
determining an ordering of packet processing modules based on the analyzing, wherein a packet of the packets in at least one packet data stream passes through the packet processing modules until the packet meets a criteria associated with a packet processing module or the packet has been passed through all of the packet processing modules; and
dynamically rearranging the ordering of the packet processing modules into the determined ordering,
wherein the analyzing comprises determining an average cost (C) of analyzing the packets in the packet data stream, and wherein
$D^T$ is a vector denoting the order of the packet processing modules, W is an estimated execution length vector, P is a probability vector denoting respective probabilities that a packet meets the criteria associated with a respective packet processing module and L is a vector denoting an execution length for each packet processing module, and
$D^T$ denotes that element $$d_i = j, (i,j \in [0,n))$$

indicates that the i-th packet processing module is scheduled at the j-th position, and
the C is determined by the equation $$\text{Min} C = \sum_i \{D^T \cdot W(P, L)\}.$$

2. The method of claim 1, wherein the dynamically rearranging further comprises assigning packet processing modules to module groups, reassigning packet processing modules to different module groups and changing a sequential order of the module groups, wherein each module group comprises one or more packet processing modules.

3. The method of claim 1, wherein the packet processing modules are arranged to process in parallel, sequentially, or a combination of both.

4. The method of claim 1, wherein the computational complexity information pertaining to a packet processing module comprises an execution length of the packet processing module in terms of at least one of processing cycles and time.

5. The method of claim 1, wherein the ordering of the packet processing modules optimizes system performance in terms of overall throughput and delay.

6. The method of claim 1, wherein the packet processing modules comprise service identification modules that identify services, wherein data for the services is divided into packets that form the at least one packet data stream.

7. The method of claim 1, wherein the determining of the ordering comprises sorting the packet processing modules in descending order according to an estimated execution length measured in terms of at least one of processing cycles and time.

8. An apparatus, comprising:
an analyzing unit configured to analyze traffic composition information derived from packets in at least one packet data stream and computational complexity information pertaining to packet processing modules that process the packets of the at least one packet data stream;
a determining unit configured to determine an ordering of packet processing modules based on the analyzing by the analyzer, wherein the determining unit is configured to pass a packet of the packets in at least one packet data stream through the packet processing modules until the packet meets a criteria associated with a packet processing module or the determining unit has passed the packet through all of the packet processing modules; and
a rearranging unit configured to dynamically rearrange the packet processing modules into the determined ordering,
wherein the analyzing unit determines an average cost (C) of analyzing the packets in the packet data stream, and wherein
$D^T$ is a vector denoting the order of the packet processing modules, W an estimated execution length vector, P is a probability vector denoting respective probabilities that a packet meets the criteria associated with a respective packet processing module and L is a vector denoting an execution length for each packet processing module, and $D^T$ denotes that element $$d_i = j, (i, j \in [0, n))$$

indicates that the i-th packet processing module is scheduled at the j-th position, and
the analyzing unit is configured to determine the average cost C by the equation $$MinC = \sum_i \{D^T \cdot W(P, L)\}.$$

9. The apparatus of claim 8, wherein the rearranging unit is further configured to perform one or more of assigning packet processing modules to module groups, reassigning packet processing modules to different module groups and changing a sequential order of the module groups, wherein each module group comprises one or more packet processing modules.

10. The apparatus of claim 8, wherein the apparatus is configured to arrange the packet processing modules to process in parallel, sequentially, or a combination of both.

11. The apparatus of claim 8, wherein the computational complexity information pertaining to a packet processing module comprises an execution length of the packet processing module in terms of at least one of processing cycles and time.

12. The apparatus of claim 8, wherein the rearranging unit is configured to order the packet processing modules which optimizes system performance in terms of overall throughput and delay.

13. The apparatus of claim 8, wherein the packet processing modules comprise service identification modules that identify services, wherein data for the services is divided into packets that form the one or more packet data streams.

14. The apparatus of claim 8, wherein the determining unit is configured to determine the ordering by sorting the packet processing modules in descending order according to an estimated execution length measured in terms of at least one of processing cycles and time.

15. The apparatus of claim 8, wherein the apparatus is one of a server and router and a switch and wherein the apparatus is located in one of a wireless network and a fixed network.

16. A non-transitory computer-readable medium embodied with a computer program, the program controlling a processor to perform:
analyzing traffic composition information derived from at least one packet data stream and computational complexity information;
determining an execution order of packet processing modules based on the analyzing, wherein packets are passed through the packet processing modules until a given packet meets the criteria associated with a packet processing module or the packet has been passed through all of the packet processing modules; and
dynamically rearranging the order of the packet processing modules into the determined execution order,
wherein the determining of the execution order comprises sorting the packet processing modules in descending order according to an estimated execution length measured in terms of at least one of processing cycles and time, and
scheduling the packet processing modules to process the packets in the at least one packet data stream in the descending order; and
executing the packet processing modules for processing a packet from the packets of the at least one packet data stream until either the packet meets the criteria associated with a packet processing module or no more packet processing modules were executed for the packet.

17. An apparatus, comprising:
analyzing means for analyzing traffic composition information derived from packets in at least one packet data stream and computational complexity information pertaining to packet processing modules;
determining means for determining an ordering of packet processing means based on the analyzing by the analyzing means, wherein the determining means passes a packet in at least one packet data stream through the packet processing means until the packet meets a criteria associated with a packet processing module or the determining means has passed the packet through all of the packet processing modules; and
rearranging means for dynamically rearranging the order of the packet processing means into the determined ordering,
wherein the determining means is configured to determine the ordering by sorting the packet processing modules in descending order according to an estimated execution length measured in terms of at least one of processing cycles and time, and
wherein the apparatus is further configured to:
schedule the packet processing modules to process the packets in the at least one packet data stream in the descending order; and
execute the packet processing modules for processing a packet from the at least one data stream until either the packet meets the criteria associated with a packet processing module or no more packet processing modules were executed for the packet.

18. A method, comprising:
analyzing traffic composition information derived from packets in at least one packet data stream and computational complexity information pertaining to packet processing modules that process the packets of the at least one packet data stream;
determining an ordering of packet processing modules based on the analyzing, wherein a packet of the packets in at least one packet data stream passes through the packet processing modules until the packet meets a criteria associated with a packet processing module or the packet has been passed through all of the packet processing modules; and
dynamically rearranging the ordering of the packet processing modules into the determined ordering,
wherein the determining of the ordering comprises sorting the packet processing modules in descending order according to an estimated execution length measured in terms of at least one of processing cycles and time, and
scheduling the packet processing modules to process the packets in the at least one packet data stream in the descending order; and
executing the packet processing modules for processing a packet from the packets of the at least one packet data stream until either the packet meets the criteria associated with a packet processing module or no more packet processing modules were executed for the packet.

19. An apparatus, comprising:
an analyzing unit configured to analyze traffic composition information derived from packets in at least one packet data stream and computational complexity information pertaining to packet processing modules that process the packets of the at least one packet data stream;
a determining unit configured to determine an ordering of packet processing modules based on the analyzing by the analyzer, wherein the determining unit is configured to pass a packet of the packets in at least one packet data stream through the packet processing modules until the packet meets a criteria associated with a packet processing module or the determining unit has passed the packet through all of the packet processing modules; and
a rearranging unit configured to dynamically rearrange the packet processing modules into the determined ordering,
wherein the determining unit is configured to determine the ordering by sorting the packet processing modules in descending order according to an estimated execution length measured in terms of at least one of processing cycles and time, and
wherein the apparatus is further configured to:
schedule the packet processing modules to process the packets in the at least one packet data stream in the descending order; and
execute the packet processing modules for processing a packet from the at least one data stream until either the packet meets the criteria associated with a packet processing module or no more packet processing modules were executed for the packet.

20. A non-transitory computer-readable medium embodied with a computer program, the program controlling a processor to perform:
analyzing traffic composition information derived from at least one packet data stream and computational complexity information;
determining an execution order of packet processing modules based on the analyzing, wherein packets are passed through the packet processing modules until a given packet meets the criteria associated with a packet processing module or the packet has been passed through all of the packet processing modules; and
dynamically rearranging the order of the packet processing modules into the determined execution order,
wherein the analyzing comprises determining an average cost (C) of analyzing the packets in the packet data stream, and wherein
$D^T$ is a vector denoting the order of the packet processing modules, W is an estimated execution length vector, P is a probability vector denoting respective probabilities that a packet meets the criteria associated with a respective packet processing module and L is a vector denoting an execution length for each packet processing module, and
$D^T$ denotes that element $$d_i = j, (i,j \in [0,n))$$

indicates that the i-th packet processing module is scheduled at the j-th position, and
the C is determined by the equation $$\mathrm{Min}\, C = \sum_i \{D^T \cdot W(P, L)\}.$$

21. An apparatus, comprising:
analyzing means for analyzing traffic composition information derived from packets in at least one packet data stream and computational complexity information pertaining to packet processing modules;
determining means for determining an ordering of packet processing means based on the analyzing by the analyzing means, wherein the determining means passes a packet in at least one packet data stream through the packet processing means until the packet meets a criteria associated with a packet processing module or the determining means has passed the packet through all of the packet processing modules; and
rearranging means for dynamically rearranging the order of the packet processing means into the determined ordering,
wherein the analyzing means determines an average cost (C) of analyzing the packets in the packet data stream, and wherein
$D^T$ is a vector denoting the order of the packet processing modules, W is an estimated execution length vector, P is a probability vector denoting respective probabilities that a packet meets the criteria associated with a respective packet processing module and L is a vector denoting an execution length for each packet processing module, and
$D^T$ denotes that element $$d_i = j, (i,j \in [0,n))$$

indicates that the i-th packet processing module is scheduled at the j-th position, and
the analyzing unit is configured to determine the average cost C by the equation $$\mathrm{Min}\, C = \sum_i \{D^T \cdot W(P, L)\}.$$

* * * * *